United States Patent
Kim et al.

(10) Patent No.: US 8,166,846 B2
(45) Date of Patent: May 1, 2012

(54) STEERING HANDLE

(75) Inventors: Eungjoo Kim, Suwon-si (KR); Jaesoon Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 306 days.

(21) Appl. No.: 12/605,215

(22) Filed: Oct. 23, 2009

(65) Prior Publication Data

US 2010/0139448 A1    Jun. 10, 2010

(30) Foreign Application Priority Data

Dec. 5, 2008    (KR) .................. 10-2008-0122834

(51) Int. Cl.
*B62D 1/04* (2006.01)
(52) U.S. Cl. ............................................. 74/552
(58) Field of Classification Search ............... 74/552; 280/728.2, 731
See application file for complete search history.

(56) References Cited

U.S. PATENT DOCUMENTS

| 6,622,591 | B2 * | 9/2003 | Albayrak et al. ............... 74/552 |
| 6,877,397 | B2 * | 4/2005 | Albayrak et al. ............... 74/552 |
| 2005/0050981 | A1 * | 3/2005 | Warhover et al. ............... 74/552 |

FOREIGN PATENT DOCUMENTS

| JP | 2000-272458 A | 10/2000 |
| JP | 2001-163225 A | 6/2001 |
| JP | 2006-256502 A | 9/2006 |
| KR | 10-530135 B1 | 11/2005 |
| KR | 2008-0017725 A | 2/2008 |

* cited by examiner

*Primary Examiner* — Vicky Johnson
(74) *Attorney, Agent, or Firm* — Morgan, Lewis & Bockius LLP

(57) ABSTRACT

The present invention is designed to lock a plurality of hooks integrally formed on ornaments to a plurality of locking projections integrally formed on a rim of an armature assembly, in order to provide a steering handle that allows the ornaments to be easily assembled by the locking projections formed on the rim and the hooks formed on the ornaments and detachably locked to the locking projections.

6 Claims, 6 Drawing Sheets

STEERING HANDLE

CROSS-REFERENCE TO RELATED APPLICATION

The present application claims priority to Korean Application Serial Number 10-2008-0122834, filed on Dec. 5, 2008, the entire contents of which are incorporated herein for all purposes by this reference.

FIELD OF THE INVENTION

1. Field of the Invention

The present invention relates to a steering handle for steering a vehicle, particularly a steering handle that can be easily assembled by forming a plurality of locking projections at an armature assembly and a plurality of hooks at an ornament.

2. Description of Related Art

Steering handles in the related art are parts that a driver operates to directly steer a vehicle in a desired direction, and connected to the end of a steering column shaft to integrally rotate.

The steering handle is composed of an armature assembly having a hub where the end of the steering column shaft is connected, a plurality of spokes radially extending outside from the hub, and a rim integrally formed with the ends of the spokes in a circular shape, and a foaming agent formed to cover the rim.

An ornament having different colors from the foaming agent for the rim is recently fixed to the rim to improve the external appearance of the steering handles.

In the related art, in order to fix the ornament to the rim, a separate fixing member having a locking projection formed by insert molding was inserted in the armature assembly and a hook that is locked to the locking projection was formed at the ornament to fix the ornament to the rim by locking the hook to the locking projection.

However, there was a problem in that the above structure for fixing an ornament in the related art requires an additional process of manufacturing the separate fixing member and the insert molding. Further, the number of parts increases, thereby deteriorating productivity of vehicles and increasing the prime cost.

Further, there was a problem in that since it is required to apply a sliding core in the mold structure due to the shape of the locking projection formed at the fixing member to manufacture the fixing member, the structure of the mold becomes complicated and the cost for manufacturing the mold and the prime cost are increased.

According to another example that has been proposed in the related art, a locking projection is formed at a foaming agent covering the rim of the armature assembly and a hook that is locked to the locking projection is formed at the ornament to combine the ornament with the rim. However, there was a problem in that the locking projection formed at the foaming agent is not sufficient to ensure a fastening force of the ornament and the rim because the foaming agent itself has low rigidity, and the ornament is separated from the rim and sharp portions of the ornament injure a driver, when the driver's body is bumped against the steering handle in a collision.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a steering handle that allows ornaments to be easily assembled by a plurality of locking projections formed on a rim and a plurality of hooks formed on ornaments and detachably locked to the locking projections.

In an aspect of the present invention, the steering handle may be assembled by locking a plurality of hooks integrally formed on an ornament to a plurality of locking projections integrally formed on a rim of an armature assembly.

The locking projections may include at least an inward locking projection protruding inwards from the rim, and at least an outward locking projection protruding outwards from the rim.

The hooks may include at least an inward hook protruding inwards from the ornament and detachably coupled to the at least an inward locking projection, and at least an outward hook protruding outwards from the ornament and detachably coupled to the at least an outward locking projection.

Contact points of the at least an inward hook and the at least an inward locking projection and contact points of the at least an outward hook and the at least an outward locking projection may not be aligned in a same line along the rim.

The inward and outward locking projections may be aligned alternatively along the rim and corresponding inward and outward hooks are alternatively formed on the ornament along the rim.

In another aspect of the present invention, the locking projections may protrude radially inside from the rim, wherein the locking projections and the hooks are arranged in zigzags with difference in height in an up-down direction thereof.

The armature assembly may have a hub where a steering column shaft is connected to integrally rotate and a plurality of spokes that extend radially outside from the hub, and the rim may be formed in a circular shape connecting ends of the spokes.

According to various aspects of the present invention, since the hooks formed on the ornaments are locked to the locking projections formed in zigzags on the rim, it is possible to fix the ornaments to the rim stably in the up-down direction and the left-right direction. Further, since it is not required to use a specific fixing member, it is possible to reduce the number of parts and the manufacturing cost. Furthermore, since the ornaments and the armature assembly are simultaneously deformed in the same shape when impact is applied to them, impact resistance is improved.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
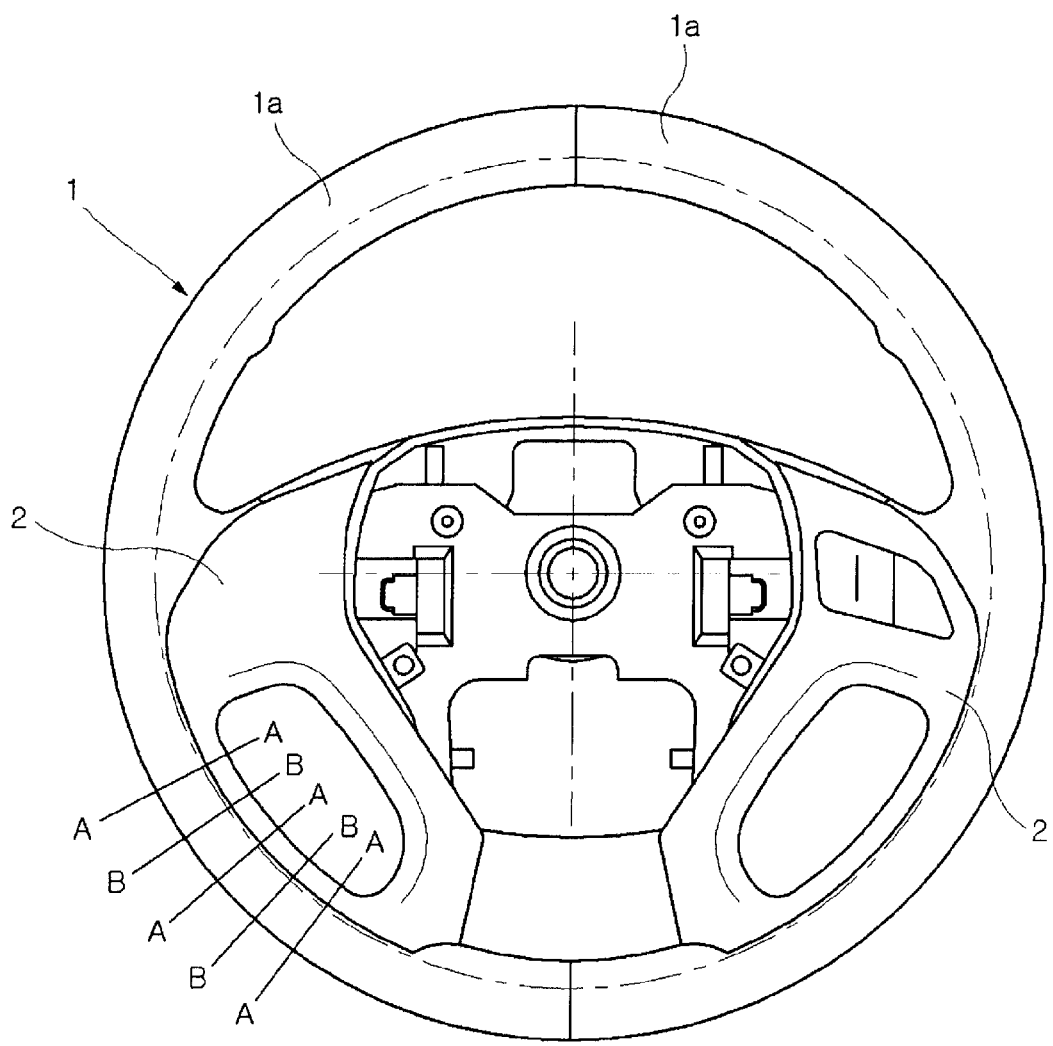
FIG. 1 is a perspective view showing when an ornament is combined with a steering handle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, two ornaments 2 are symmetrically combined to improve the external appearance of a steering handle 1. Ornament 2 have different colors from foaming agents 1a constituting a portion of steering handle 1 and covering the rim of steering handle 1, such that many colors can be provided for the steering handle and the external appearance is correspondingly improved. Foaming agents 1a are formed in an exact semicircular shape and have different colors from each other, but may have the same color.

Figure 2:
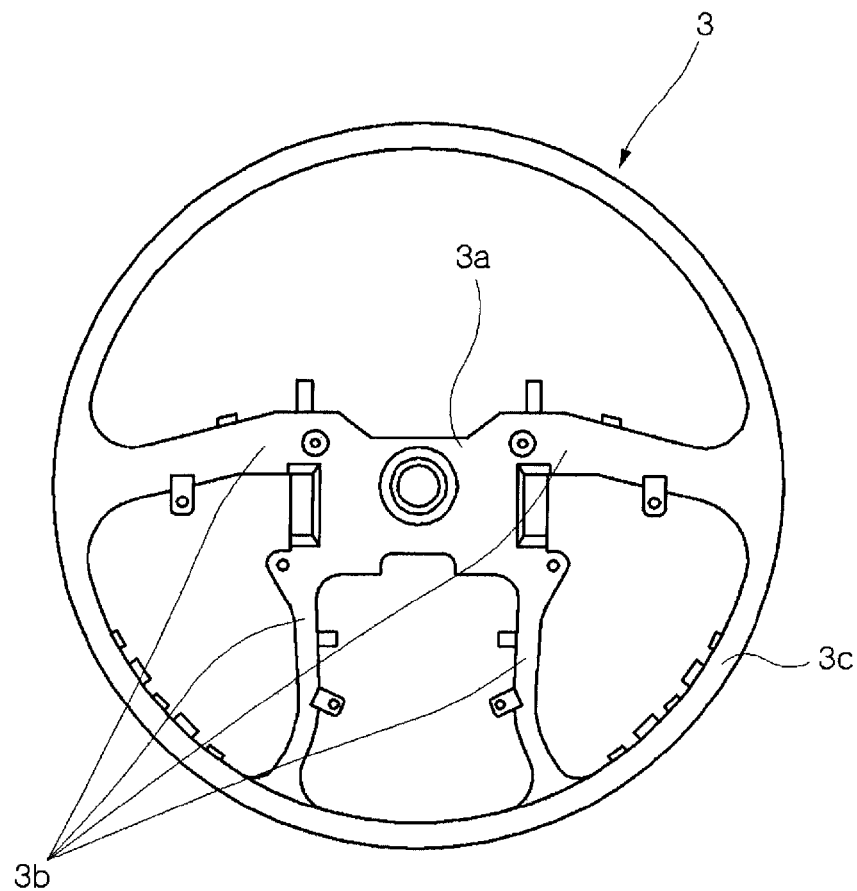
FIG. 2 is a perspective view of an armature assembly having a plurality of locking projections according to an exemplary embodiment of the present invention.
Figure 2:
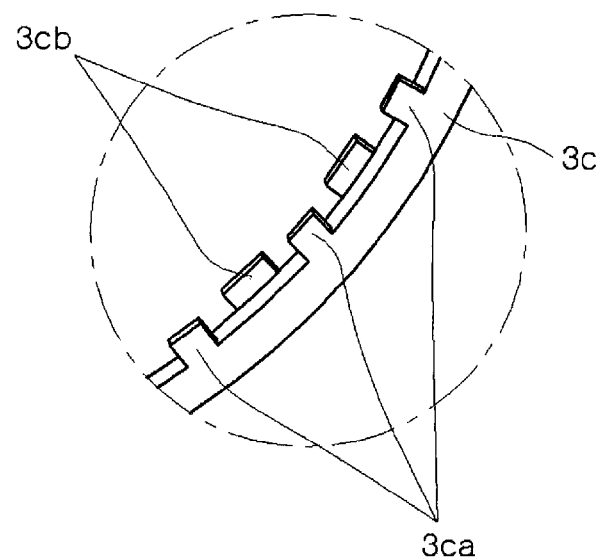

Referring to FIG. 2, an armature assembly 3 has a center hub 3a where a steering column shaft is connected to integrally rotate, a plurality of spokes 3b radially extending outside from hub 3a, and a circular rim 3c integrally connecting the ends of the spokes.

A plurality of locking projections 3ca, 3cb integrally protrude radially from a portion of rim 3c to detachably combine ornament 2. Locking projections 3ca, 3cb are left-right symmetrically formed and two ornaments 2 are left-right symmetrically combined.

The locking projections 3ca, 3cb are formed in zigzags in the up-down direction along the rim 3c. The outward locking projection 3cb is disposed between the inward locking projections 3ca, such that the inward locking projections 3ca and the outward locking projections 3cb are arranged in zigzags with a difference in height.

Locking projections 3ca, 3cb are arranged left-right symmetrically in two pairs.

Figure 3:
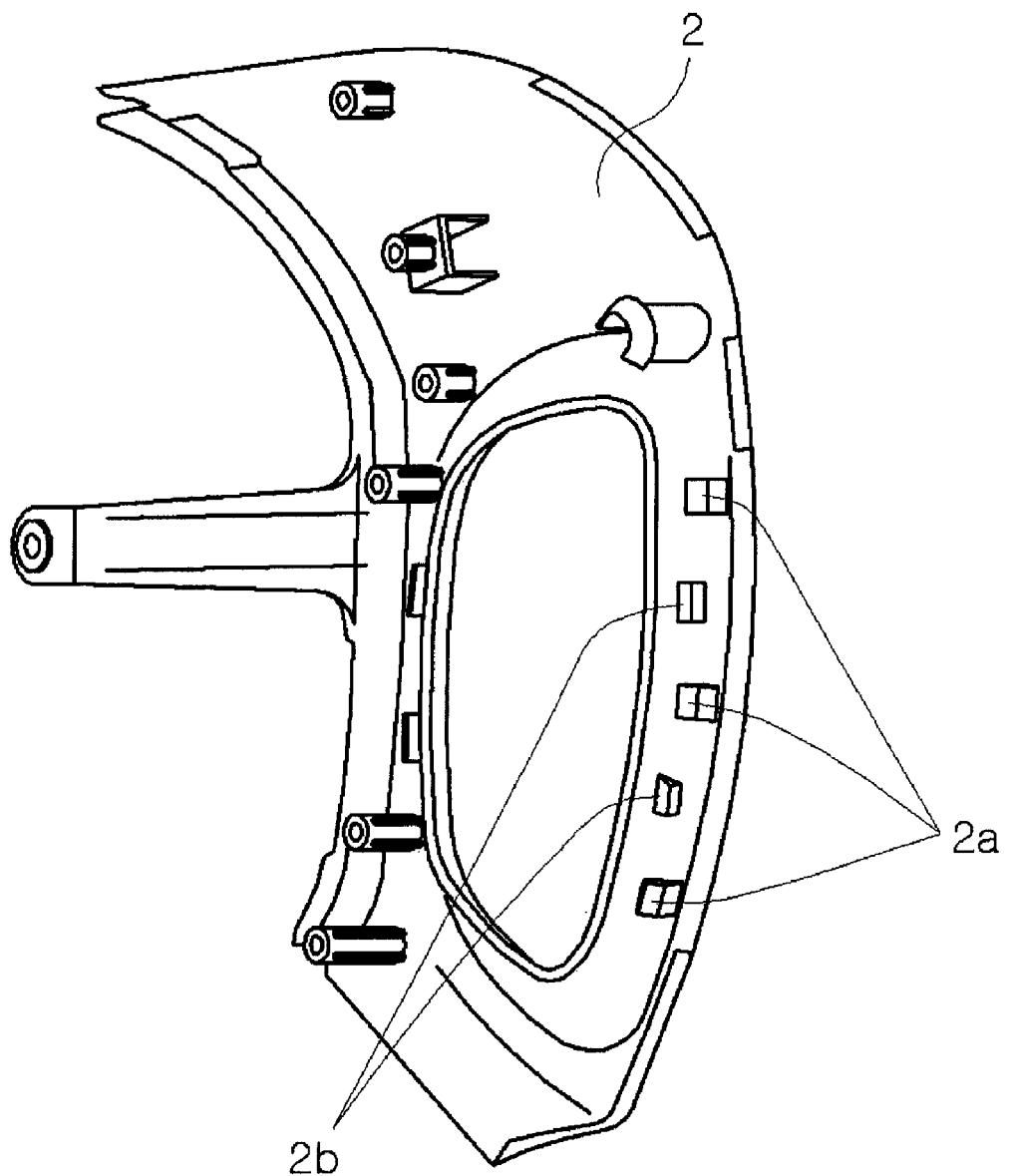
FIG. 3 is a perspective view of an ornament having hooks according to an exemplary embodiment of the present invention.

Referring to FIG. 3, an inward hooks 2a that are locked to inward locking projections 3ca and outward hooks 2b that are locked to outward locking projections 3cb integrally protrude around the inner edge of ornament 2, and the outward hooks 2b are disposed between the inward hooks 2a in zigzags.

Figure 4:
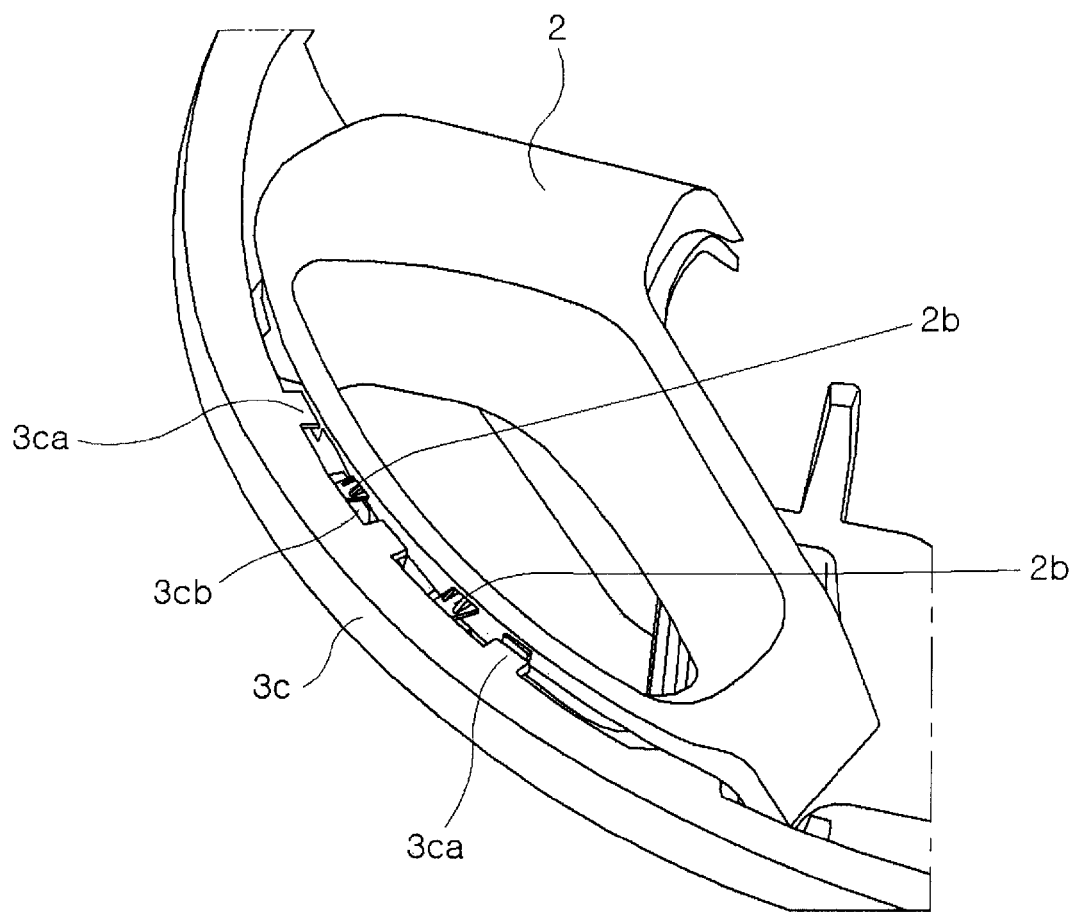
FIG. 4 is a perspective view showing when the hooks of the ornament are locked to the locking projection of a rim according to an exemplary embodiment of the present invention.
Figure 5:
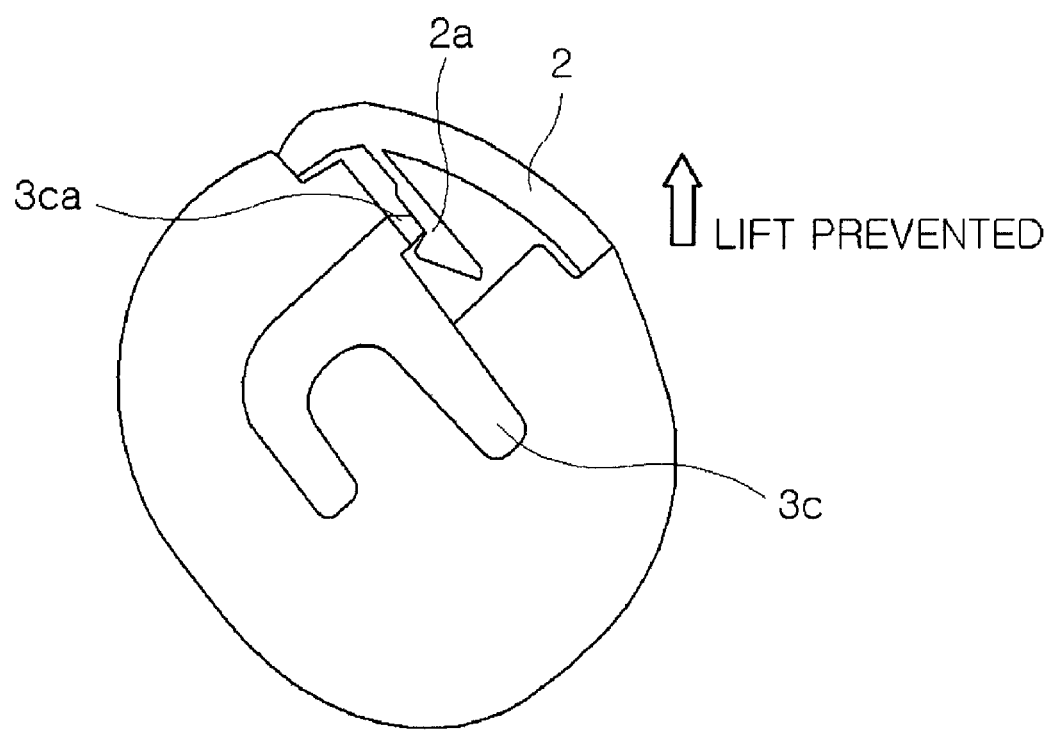
FIGS. 5 and 6 are cross-sectional views taken along the lines A-A and B-B of FIG. 1, respectively.
Figure 6:
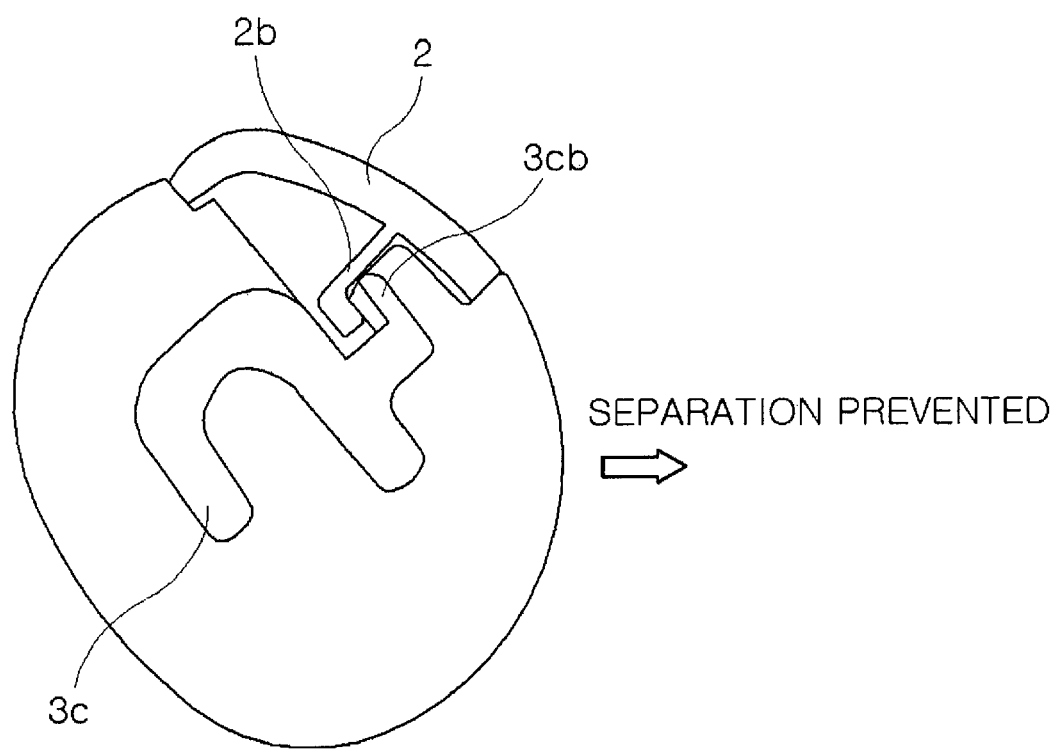

FIG. 4 is a perspective view showing when locking hooks 2a, 2b are locked to locking projections 3ca, 3cb, FIG. 5 is a cross-sectional view taken along the line A-A of FIG. 1, and FIG. 6 is a cross-sectional view taken along the line B-B of FIG. 1.

As shown in detail in the perspective view and cross-sectional views, as inward hooks 2a are locked to inward locking projections 3ca, ornament 2 is restricted upward, and as outward hooks 2b are locked to outward locking projections 3cb, the ornament is restricted horizontally, such that the ornament is stably fixed to the rim of the armature.

In an exemplary embodiment of the present invention, contact points of the inward hooks 2a and the inward locking projections 3ca and contact points of the outward hooks 2b and the outward locking projections 3cb are not aligned in a same line along the rim 3c. In this construction, the ornament 2 can be firmly coupled to the rim in vertical and horizontal direction thereof.

Further, as the ornaments are stably fixed to the rim by the locking projections and the hooks, it is possible to prevent the ornaments from separating from the steering wheel and injuring a driver, when the driver's body is bumped against the steering handle in a collision.

For convenience in explanation and accurate definition in the appended claims, the terms "inward" and "outward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering handle assembled by locking a plurality of hooks integrally formed on an ornament to a plurality of locking projections integrally formed on a rim of an armature assembly, wherein the hooks include:
   at least an inward hook protruding inwards from the ornament and detachably coupled to the at least an inward locking projection; and
   at least an outward hook protruding outwards from the ornament and detachably coupled to the at least an outward locking projection; and
   wherein contact points of the at least an inward hook and the at least an inward locking projection and contact points of the at least an outward hook and the at least an outward locking projection are not aligned in a same line along the rim.

2. The steering handle as defined in claim 1, wherein the locking projections include:
   at least an inward locking projection protruding inwards from the rim; and
   at least an outward locking projection protruding outwards from the rim.

3. The steering handle as defined in claim 1, wherein the locking projections protrude radially inside from the rim.

4. The steering handle as defined in claim 3, wherein the locking projections and the hooks are arranged in zigzags with difference in height in an up-down direction thereof.

5. The steering handle as defined in claim 1, wherein the armature assembly has a hub where a steering column shaft is connected to integrally rotate and a plurality of spokes that extend radially outside from the hub, and the rim is formed in a circular shape connecting ends of the spokes.

6. A steering handle assembled by locking a plurality of hooks integrally formed on an ornament to a plurality of locking projections integrally formed on a rim of an armature assembly, wherein the hooks include:

at least an inward hook protruding inwards from the ornament and detachably coupled to the at least an inward locking projection; and at least an outward hook protruding outwards from the ornament and detachably coupled to the at least an outward locking projection; and wherein the inward and outward locking projections are aligned alternatively along the rim and corresponding inward and outward hooks are alternatively formed on the ornament along the rim.

\* \* \* \* \*